Sept. 3, 1957 E. H. CUSHMAN 2,805,323
POWDER FEEDING METHOD AND APPARATUS
Filed June 20, 1956

*INVENTOR.*
EVERETT H. CUSHMAN

BY H. Henne Matthews
Edmund W Bopp

ATTORNEY & AGENT 2,805,323
Patented Sept. 3, 1957

2,805,323
POWDER FEEDING METHOD AND APPARATUS

Everett H. Cushman, South Plainfield, N. J., assignor to Air Reduction Company, Incorporated, New York, N. Y., a corporation of New York Application June 20, 1956, Serial No. 592,599

4 Claims. (Cl. 219—130)

This invention relates to methods and apparatus for feeding granular magnetic material in the vicinity of a current carrying conductor and more particularly to methods and apparatus for feeding granular magnetic material to an arc welding electrode in the vicinity of the arc to continuously form thereon an electrode coating. By magnetic material is meant any material or mixture of materials consisting wholly of or containing a constituent having magnetic (paramagnetic) properties.

One of the most popular and successful arc welding methods presently in use is the "coated" or "stick" electrode welding method. In this form of welding a coating is formed on a wire electrode by extrusion or dipping. The coating is so formulated as to provide one or more of the functions of providing a fluxing action, providing a shielding atmosphere, modifying the arc characteristics, and providing filler metal and alloying ingredients to the weld. While this welding technique is eminently successful it has certain inherent limitations which it has been sought for years to overcome. It is, for example, a distinct disadvantage to be limited to short stick length electrodes. Such lengths result in a low welding duty cycle, stub end losses and varying welding conditions as the electrode length (and hence the electrode resistance) diminishes. Accordingly it is most desirable to provide a continuous arc welding method employing a bare wire electrode of indefinite length in a manner to match or exceed the results of "stick" electrode welding while overcoming the disadvantages imposed by that method.

One such attempt is the so called "magnetic flux" welding method, disclosed in detail in British patent specification 608,270 and in a paper entitled "Improved Semiautomatic Welding and Hard Facing," by Howard S. Avery et al. published on pages 1093 et seq. of the November 1954 issue of the Welding Journal. In this method a bare welding electrode of indefinite length is employed with a granular flux containing a substantial concentration of magnetic (paramagnetic) material fed by gravity from a hopper to the wire in the vicinity of the arc. As welding current flows in the wire a magnetic field is established around the wire and the magnetic flux comes within the influence of this field and adheres magnetically to the wire to form thereon a coating.

Difficulty is encountered with the use of these prior art devices in that if the concentration of the magnetic component in the powder is high, or if the field strength is great as a result of the passage of a high welding current through the wire the powder compacts in the apparatus and uniform feeding is prevented. This compacting or "damming" as it will hereinafter be referred to, is the result of the mutual attraction of the magnetic particles to one another when in the influence of the magnetic field caused by the passage of welding current to and through the electrode wire.

It is an object of the present invention therefore to provide a method and apparatus for the simultaneous passage of magnetic powder and electric current to an electric conductor without exposing the magnetic powder to the influence of a magnetic field.

Another object is to provide an arc welding device through which welding powder having a magnetic component may be freely fed to an arc welding electrode without regard to the value of the welding current or the magnetic permeability of the powder.

These and other objects and advantages of the invention will be pointed out or will become apparent from the following detailed description and the accompanying drawings.

According to the present invention two concentrically arranged cylinders are electrically connected by a symmetrical radial conductor at one end thereof. The electric conductor, such as an arc welding electrode, is positioned within and in electrical contact with the inner cylindrical member. Electric current is supplied to the device at the upstream end of the outer cylinder from which it passes through the length of the outer cylinder into the downstream end of the inner cylinder by way of the interconnecting radial conductor. The magnetic powder is fed through the annular passage between the inner and outer cylindrical members where it is discharged around the electrode or other conductor below the point at which current transfers from the inner cylinder to the conductor. With this configuration the magnetic powder flows freely through the annular passage without any magnetic damming regardless of the current intensity or the composition of the powder.

Figure 1:
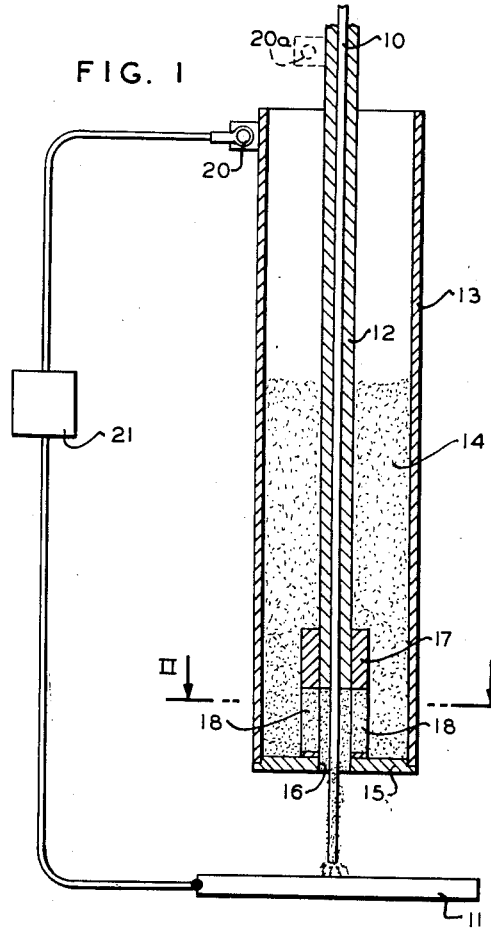
Fig. 1 illustrates a simple form of the invention as it is applied to the problem of feeding magnetic powder to a consuming arc welding electrode.
Figure 2:
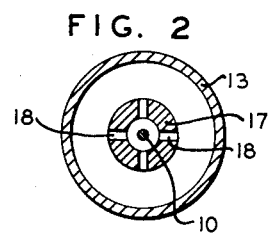
Fig. 2 is a sectional view taken along line II—II of Fig. 1.

Referring to Figs. 1 and 2, a wire arc welding electrode 10 is illustrated in arcing relation with respect to a workpiece 11 to be welded. The electrode is advanced toward the workpiece at a rate to maintain the arc therebetween as metal is transferred across the arc from the electrode to the workpiece. The electrode is fed through a conductive metal contact tube 12, preferably copper, with which the electrode makes electrical contact. A cylindrical hopper wall 13 concentrically surrounds the contact tube 12 to form in the annular space therebetween a receptacle for magnetic powdered material 14 to be fed to the electrode in the vicinity of the arc. The bottom of the hopper is closed off by a disc like bottom plate 15 containing a centrally located hole 16 through which the wire and powder pass to the arc. An inner upstanding perforate cylindrical member 17 surrounds the hole 16 in the bottom plate and supports the contact tube 12 concentrically with respect to the hopper wall 13. The hopper wall 13, the bottom plate 15, the inner cylindrical member 17 and the contact tube 12 are all formed of electrically conductive materials such as copper or brass, and are assembled by silver soldering or otherwise to form a rigid electrically conductive assembly. The cylindrical member 17, as illustrated, contains elongated holes or slots 18 near its lower end through which powder in the hopper is free to pass to the electrode 10 and the hole 16 in the bottom plate 15, surrounding the electrode.

Welding current is introduced to the assembly through a lug 20 at a point near the top of the hopper 13. The welding current is supplied from any conventional welding power source 21, A. C. or D. C., connected to the work 11 and the lug 20. Current introduced at lug 20 is conducted by the hopper wall 13 to the bottom plate 15 from which it passes to the cylindrical member 17 and the contact tube 12. The current passes from the contact tube to the electrode at one or more points as is occasioned by the random contact of the electrode and the contact tube as the electrode passes therethrough. Because the contact tube is relatively long and is only slightly larger in inside diameter than the electrode, and because the electrode usually has a permanent cast or curvature, adequate contact at at least one point is always assured.

In all prior art devices in which a magnetic powdered material could be fed to a current carrying conductor such as the welding electrode, the powder would come within the magnetic field around the current carrying conductor prematurely and the individual particles would tend to adhere to one another and prevent feeding. In accordance with the present invention as exemplified by the apparatus described herein, such magnetic damming of the powder becomes impossible, regardless of the magnetic permeability of the powder being used or the strength of the current flowing in the conductor.

The reason for the lack of magnetic damming may best be understood by considering individual current carrying components. Consider first the magnetic field resulting from the passage of current through the length of the cylindrical hopper wall 13 from the point of introduction of current thereto to the bottom plate 15. It is a well established fact that the magnetic field strength is zero inside a cylindrical conductor. Accordingly the current passing through this portion of the apparatus has no magnetic effect on the enclosed powder. Verification of this principle may be found in many authoritative texts on the subject such as Chapter VII (specific statement on page 224) of the second edition of Principles of Electrical Engineering by Timble and Bush published 1930 by John Wiley and Sons. The current is conducted radially inwardly from the base of the hopper wall 13 to the base of the upstanding cylindrical member 17 by the base plate 15. It is axiomatic that magnetic lines of force must be closed figures and must include within the closed loop the magnetizing current. By symmetry any lines of force resulting from the passage of current through the plate would be concentric with respect to the longitudinal axis of the apparatus. Since such lines of force do not enclose a net current above the plate, such lines cannot exist.

From the base plate 15 the current flows up through the upstanding cylindrical member 17 and the contact tube 12 to the point or points at which it transfers to the electrode wire 10. This current would produce magnetic flux lines within the powder hopper were it not for the fact that an exactly equal and opposite current must necessarily flow in the electrode inasmuch as these elements are electrically in series. In other words any current that goes up through the cylinder and contact tube must come down through the electrode. These currents being necessarily equal and opposite produce cancelling fields for the full length of their parallel path. The exact point or points of current transfer from the contact tube to the electrode wire is immaterial to this result.

Below the base plate 15 there is a strong field surrounding the electrode when welding current is being conducted therethrough.

Extensive experiments have demonstrated conclusively that with the apparatus described there is in fact no magnetizing force present which can prevent free feeding of the magnetic powder. Iron powder, when placed in hopper 13 feeds freely from the bottom through the slots 18 in cylinder 17 and out through the orifice 16 in the base plate 15 surrounding the electrode 10, without any tendency to dam or block. As the powder comes within the influence of the field surrounding the electrode it adheres tenaciously thereto. For purposes of comparison current was introduced to the device through lug 20A (shown in broken line), and with all other conditions the same the iron powder immediately dammed up as it was attracted to the outside of the contact tube.

In the apparatus illustrated in the drawings and described above, no insulation is shown. Obviously it is necessary for safety purposes to provide insulation on the outside of the apparatus. Experiments that have been conducted with the apparatus illustrated and described indicate that it is not necessary to insulate the inside of the hopper or the outside of the contact tube for proper functioning. Conceivably, the current could short circuit the desired path down the hopper wall and up into the contact tube by being conducted through the magnetic powder itself from a point high in the hopper directly across to the contact tube. If this occurred, the apparatus would not function in the desired manner and damming would occur. Actually this problem never arose because even though the powder in the hopper offered a parallel path for the current, this parallel path was of such high resistance (compared to the principal path) that the proportion of current flowing in it was negligible. Even when one hundred percent iron powder was employed there was no short circuiting through the powder in the uninsulated apparatus. With a highly conductive powder well compacted in the hopper the alternate electrical path so provided could in theory become a factor that would lead to unsatisfactory operation of the device. To avoid any possibility of this, the inner wall of the hopper or the outer wall of the contact tube and the cylindrical member 17 or both, can be insulated to prevent the flow of current in any such alternate electrical path.

The principle upon which the above described elementary apparatus is based can of course, be carried over into many other forms of apparatus intended for feeding magnetic powders to an electrical conductor such as a welding electrode. For instance, in a modification of the magnetic flux welding method, magnetic powder is carried to a welding arc in a carrier gas which may or may not act additionally as an arc shielding atmosphere. In general, such a system involves the use of a welding head through which gas containing magnetic powders may be fed to the electrode in the region of the arc. As the gas and powder emerge from the apparatus the powder adheres to the welding electrode in the manner described above, and the gas passes to the atmosphere either in a direction to act to shield the arc, or is diverted to avoid impingement on the weld. There are many advantages to such a process. One such advantage is that the feeding of the powder is not dependent upon gravity, and therefore the apparatus may be used for welding in all positions. Another advantage is that the powder hopper and feeding mechanism may be remotely located with respect to the welding head or gun.

Figure 3:
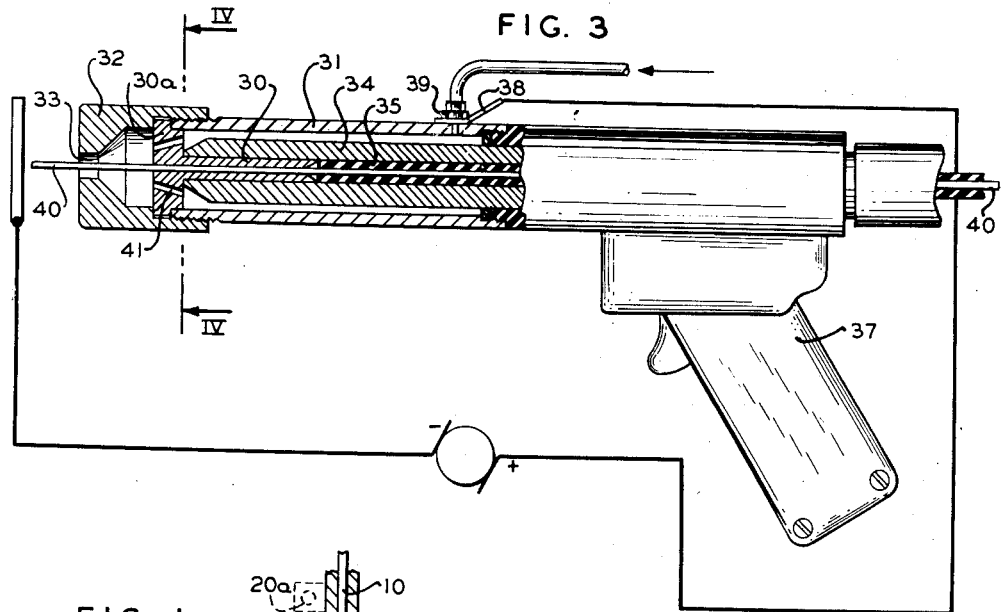
Fig. 3 illustrates a modified form of the invention wherein the powder is conveyed in a gas stream.
Figure 4:
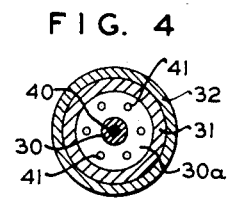
Fig. 4 is a sectional view taken along line IV—IV of Fig. 3.

Figures 3 and 4 illustrate a welding gun for use in such a process in which the principles of the present invention are incorporated in the construction of the gun.

The elements of the gun are essentially the same as those described above, and include a contact tube 30 through which electrode wire may be fed, an outer barrel 31 concentrically surrounding the contact tube through which the powder laden gas stream may be fed, and a perforate plate 30A interconnecting the downstream ends of the barrel 31 and contact tube 30 respectively. In this particular construction the contact tube 30 and the interconnecting perforate plate member 30A between the outer barrel 31 and the contact tube 30 constitute a unitary structure. The contact tube is flanged at its downstream end, and this flange is clamped between the end of the outer barrel 31 and a nozzle cap 32 which screws on the downstream end of the outer barrel. The nozzle cap 32 has a centrally located orifice 33 through which the electrode wire, gas and powder are discharged. An inner barrel 34 including a liner 35 acts as a guide for the wire as it passes through the gun from the rear thereof to the contact tube. If designed for manual operation, the gun may have a handle such as the pistol grip 37 illustrated. Welding current is supplied to the gun through an appropriate lug 38 attached to the gun by the same fitting 39 through which the gas and powder are admitted to the gun. Since this is cylindrical in form there is no magnetic field within it as a result of the passage of welding current therethrough.

The electrode wire 40 is preferably mechanically fed into the rear of the gun and is guided through the inner barrel 34 to the contact tube 30 and emerges from the gun through the orifice 33 in the nozzle cap 32. Magnetic powder conveyed by a flowing gas stream enters the gun through fitting 39 and passes down through the annular inter-space between the inner and outer barrels, passes through a series of angularly drilled holes 41 in the flanged portion 30A of the contact tube element, and discharges from the nozzle cap 32 through the orifice 33 therein in the close proximity of the electrode wire. Welding current enters the gun through lug 38 and is conducted through the outer barrel 31 to the contact tube and the electrode wire and thence down the wire to the arc. For the reasons described in detail above, there is no magnetic field within this configuration to cause magnetic damming of the powder in the apparatus. When the gas and powder emerge in the vicinity of the wire in or below the nozzle cap, the powder adheres magnetically to the wire and the gas is discharged around the electrode as an arc shielding atmosphere.

While only two specific structures have been described in detail it is obvious that certain modifications and variations of the apparatus can be made in accordance with the present invention. While the specific embodiments described included contact elements and outer barrel elements in the form of right circular cylinders the principles are believed to be equally applicable to all concentric surfaces of revolution. Obviously other configurations that represent a close approximation to a surface of revolution are also suitable.

It will be evident that as a result of this invention powdered magnetic materials may be fed to an electrical conductor without danger of magnetic damming regardless of the composition of the powder or the strength of the current. It is understood that the invention is not restricted to the limited number of forms illustrated and described, but may be used in other ways without departure from its spirit as defined by the following claims.

I claim:

1. The method of simultaneously conveying electric current and finely divided solid material having paramagnetic properties to an electrical conductor without the occurrence of magnetic damming of the powder which comprises introducing the electric current to the conductor by conduction through an electrically conductive cylindrical member and introducing the finely divided paramagnetic material to the electrical conductor by passing it through the region enclosed by said cylindrical member.

2. Electric arc welding apparatus comprising a wire guide and electric current contact element adapted for the passage therethrough of a welding electrode wire in electrical contact therewith, an electrically conductive member describing a surface of revolution surrounding said wire guide and contact element, means for admitting powdered magnetic material into the interspace between said wire guide and contact element and said surrounding electrically conductive member, means for discharging said powdered material from said interspace into the region at which the electrode wire emerges from said wire guide and contact element, means for admitting welding current to said surrounding member at a point remote from the end of said member nearest to the arc and means for conducting said current from the end of said member nearest the arc to the end of the wire guide and contact element nearest the arc by a symmetrically arranged interconnecting conductor.

3. In an arc welding system in which a wire electrode is fed toward a workpiece at a rate to maintain an arc therebetween as metal is transferred across said arc from said electrode to said workpiece, and in which pulverulent material having paramagnetic properties is fed to the electrode at a point near the arc end of the electrode to adhere to the electrode magnetically as a result of the magnetic field created around said electrode by the passage of welding current therethrough, the improvement which comprises introducing the welding current to the electrode from a contact tube arranged within an electrically conductive outer cylindrical member, passing the pulverulent material to the electrode in the region of the arc through the space between the contact tube and the outer cylindrical member, introducing the welding current to the contact tube at the end thereof nearest the arc end of the electrode, and passing the welding current longitudinally through the outer cylindrical member to the contact tube.

4. In a method of arc welding wherein a consumable wire electrode is fed continuously to a welding arc through a contact tube which supplies welding current to said electrode adjacent the arc end threof, and wherein said electrode is continuously coated electromagnetically by forces created by the flow of said welding current with a finely divided coating material as it issues from said contact tube, the improvement which comprises feeding said coating material to said electrode through a passage bounded by a wall forming means which acts to isolate the coating material while flowing through said passage from the electromagnetic forces created by the flow of said welding current.

References Cited in the file of this patent

FOREIGN PATENTS 608,270     Great Britain  _____  Sept. 13, 1948